INVENTORS
FRED R. KERNS
ROBERT R. MEASE

INVENTORS
FRED R. KERNS
ROBERT R. MEASE

Oct. 24, 1961   F. R. KERNS ET AL   3,005,535
AUTOMATIC TRANSFER MACHINE
Filed Dec. 23, 1959   6 Sheets-Sheet 4

INVENTORS
FRED R. KERNS
ROBERT R. MEASE

Figure 1:
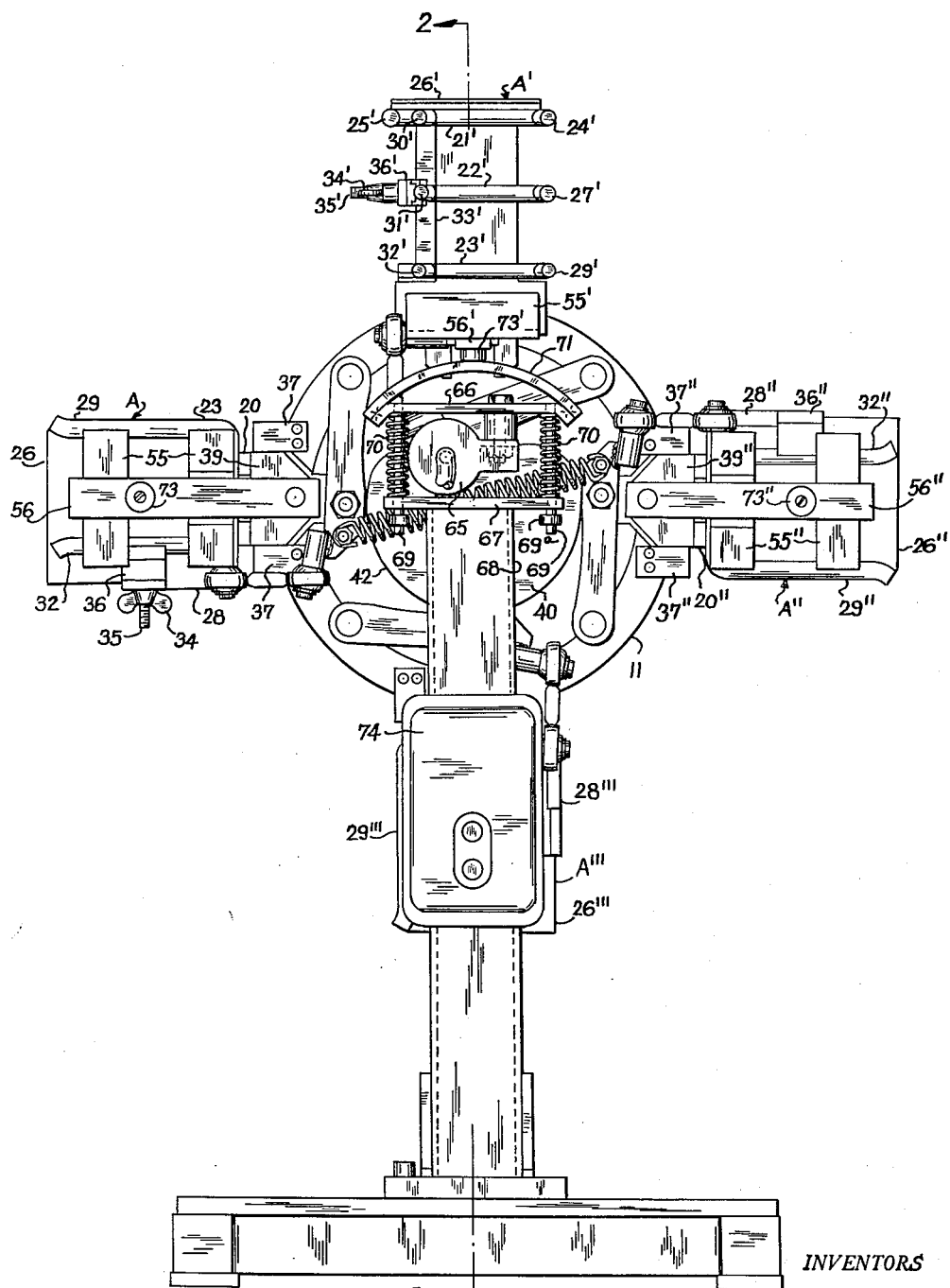
Figure 3:
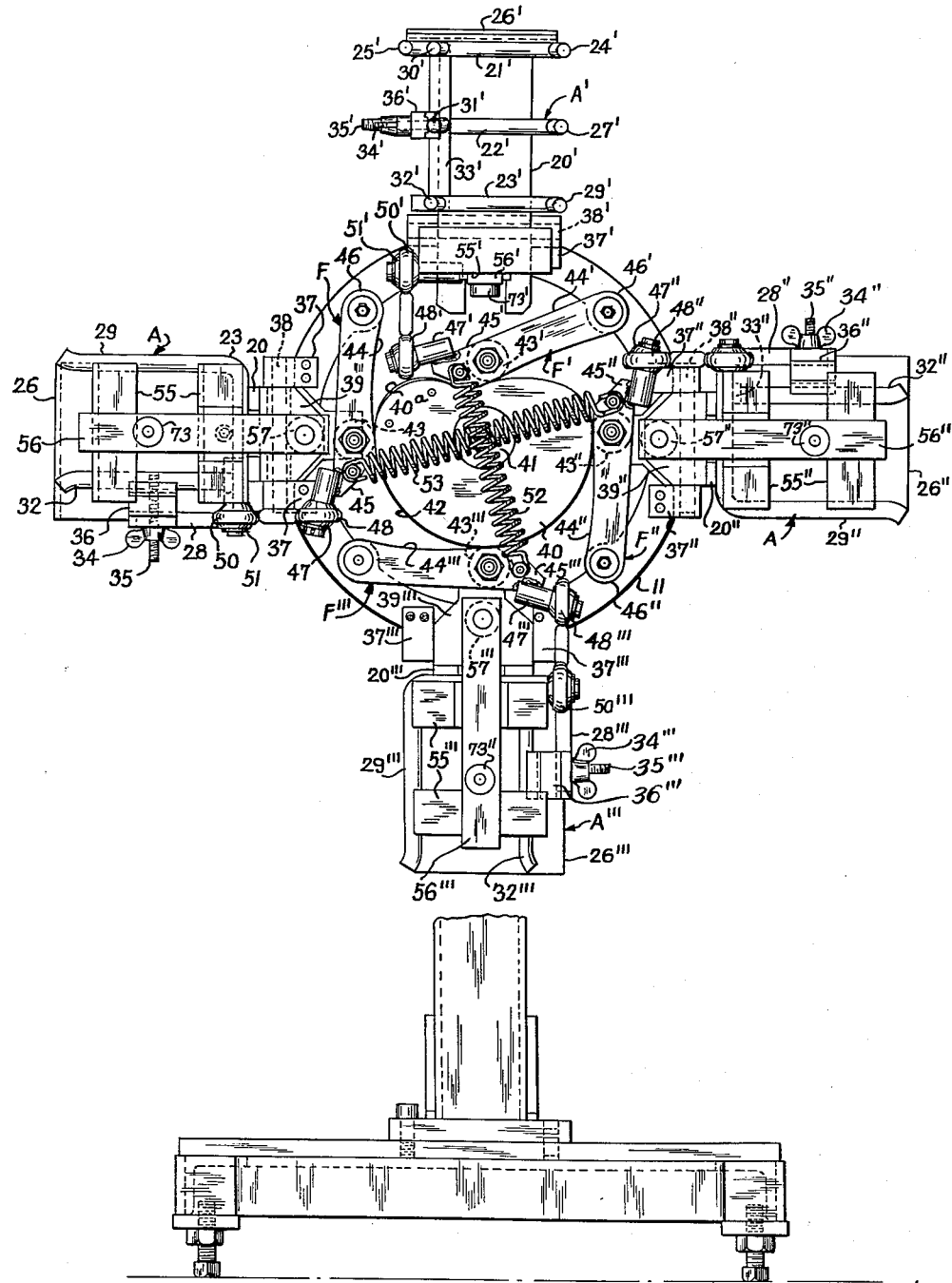

INVENTORS
FRED R. KERNS
ROBERT R. MEASE though an angle of the order of ninety degrees to move the workholders in sequence through the four stations in which they are shown in FIGS. 1 and 3. In the machine illustrated, the first or left-hand station as viewed in FIGS. 1 and 3 is the loading station and while a workholder is in this position a stack of articles is inserted therein. Concurrently a stack of articles is removed from the workholder in the third or right-hand station, that is the unloading station. The second or top station is the aligning station. In this station the stack of articles is vibrated to align the desired edges.

After the workholders in the loading and unloading stations have been loaded and unloaded and the workholder in the second station, that is the vibrating station, has been vibrated the desired time, the turret plate 11 is indexed in a manner hereinafter described to advance all the workholders one station.

As previously stated, the apparatus shown is designed to handle an unconnected battery cell element which comprises a group of stacked positive and negative plates 15 which are interleaved with porous nonconductive separators 16 placed between each positive and negative plate. Each of the plates 15 includes a lug 17 which projects from one edge thereof. As received by the apparatus, the lugs on the plates 15 of the unconnected battery cell element are aligned in such a manner that the lugs on the positive plates project at one side of a common edge of the stack and the lugs on the negative plates project at the other side of the same edge. The plates and separators may at times be received by the workholder in a disarranged condition such that the lugs 17 are misaligned and the separators 16 overlap or cover the lugs in a manner which would interfere with the performance of subsequent operation upon the lugs, such as a lug brushing operation. The apparatus of the present invention operates to automatically align the plate and separator edges so that the lugs extend outwardly from the stack clear of the separators so as to be exposed for a subsequent operation.

Figure 7:
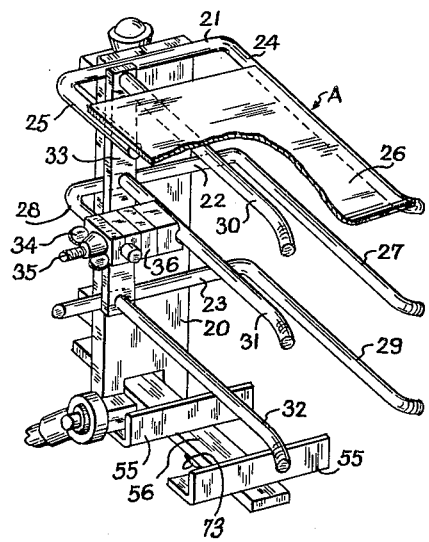

Referring to FIGS. 3 and 7 the workholder A includes a support plate 20 to which is secured a plurality of spaced rods 21, 22 and 23 forming portions of a cage structure for retaining the stack in position. The rod 21 is generally J-shaped including substantially parallel legs 24 and 25 to which is secured a plate 26, also forming part of the cage structure. The intermediate rod 22 also is generally J-shaped and includes substantially parallel legs 27 and 28 which extend generally parallel to the legs 24 and 25. The rod 23 is of L-shaped configuration having a leg 29 extending parallel to the legs 24 and 25. The legs 24, 27 and 29 have upwardly curved end portions and are located in a common plane which extends horizontally when the workholder A is in the loading station as shown in FIG. 1.

The workholder also consists of a plurality of spaced rods 30, 31 and 32 which are supported by a plate 33 parallel to and adjacent the plate 20. The rods 30, 31 and 32 are spaced beneath and extend generally parallel to the legs 24, 27 and 29 and are located in a common plane which extends horizontally when the workholder A is in the loading station. The terminal portions of the rods 30, 31 and 32 curve downwardly to facilitate insertion of a stack. The workholder may accommodate stacks having various thickness dimensions and for this purpose the rods 30, 31 and 32 are adjustable as a unit towards and away from the legs 24, 27 and 29 to permit variation of the spacing between the rods and legs. The rods and legs are spaced in a vertical direction which is parallel to the thickness dimension of a stack when the stack is loaded into the workholder.

Figure 5:
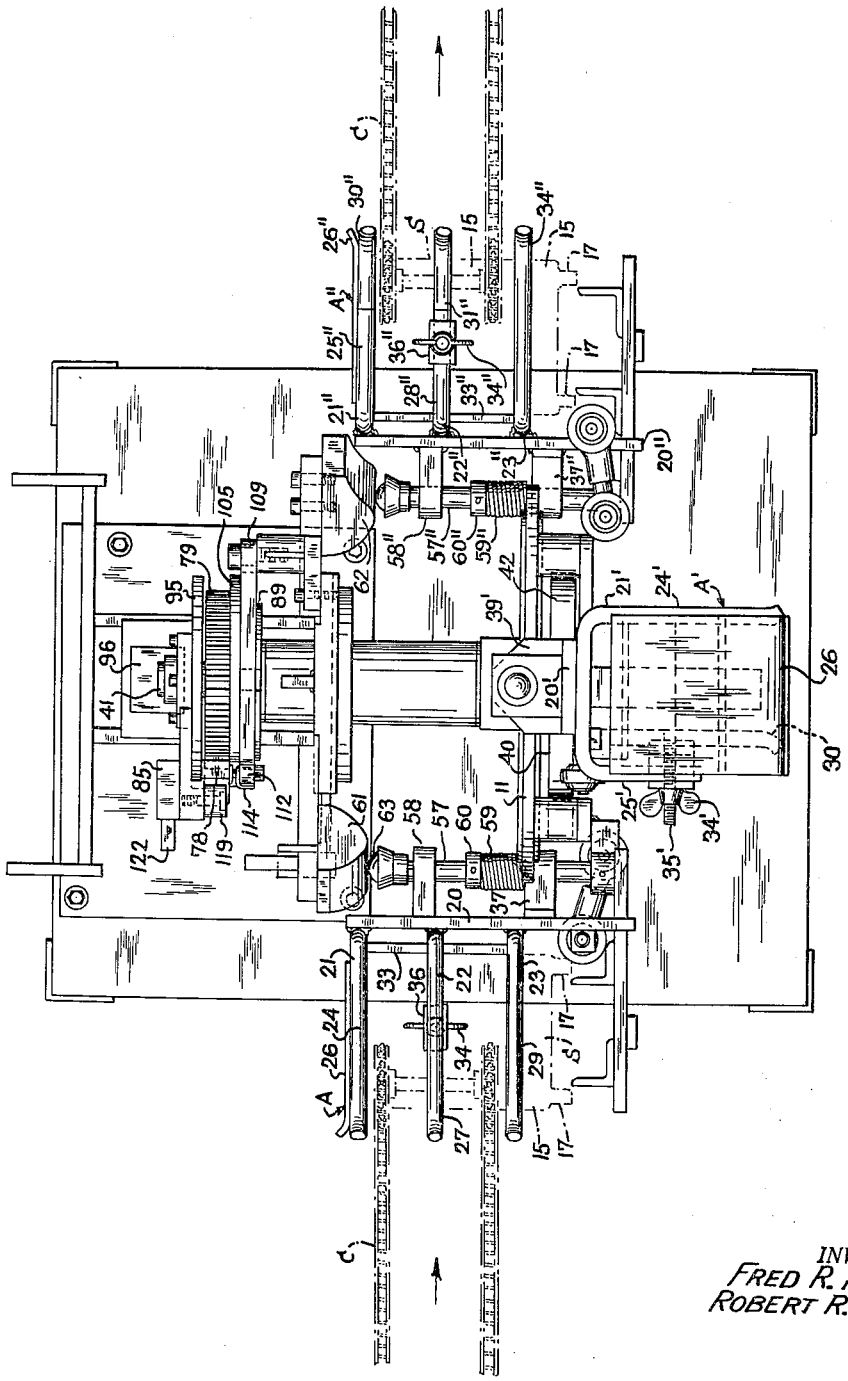

The adjustment is afforded by rotation of a wing nut 34 which threadably receives a screw 35 attached to the intermediate rod 31 and extending through a bushing 36 which is carried by the leg 28 of the rod 22. Rotation of the nut 34 is effective to displace the plate 33 with the attached rods 30, 31 and 32 towards and away from the legs 24, 27 and 29 to permit a variation in the spacing between the rods and the legs. It should be noted that the cage type structure of the workholders provided by the rods 30, 31 and 32 and the legs 24, 27 and 29 permits the workholders to straddle chain type conveyor belts as shown in FIG. 5 for automatic loading and unloading.

The workholder A is secured to the plate 11 by means of a pair of spaced lugs 37 to which is fixed a pin 38 (FIG. 3) which extends between the lugs through a bore formed in a bracket 39 located intermediate the lugs 37. The bracket 39 is secured to the plate 20 in any suitable manner as by welding.

With the described arrangement the workholder may be tilted or rotated about the axis of the pin 38. Such tilting movement of the workholder is effected during indexing rotation of the workholder towards the working station so that the stack within the workholder is shifted in a manner to position the lugs at the lower edge of the stack when the workholder is in the working station.

In order to effect such tilting movement of the workholder there is provided a cam 40 which is keyed to a stationary shaft 41 which extends horizontally through the bore formed in the shaft 12. The cam 40 is generally heart shaped and is spaced forwardly of the plate 11 to extend parallel thereto. The cam 40 has a variable radius and is provided with a peripheral camming surface 42 which cooperates with a plurality of cam follower arrangements generally designated by the reference characters F, F', F" and F"'. These follower arrangements are associated respectively with the workholders A, A', A", A"'. The cam 40 may include a slot containing an adjustable cam insert 40a to allow variation of the radius of the cam 40 over a predetermined arc.

Each of the cam follower arrangements is of identical construction and for this reason only the follower arrangement F associated with the workholder A will be described. Corresponding parts of the other follower arrangements will be designated by the same reference characters with prime, double prime and triple prime marks affixed thereto respectively.

The follower F includes a roller 43 which is rotatably carried by a lever 44 adjacent one end 45 of the lever. The other end 46 of the lever is pivotally attached to the plate 11 so that the lever may be pivoted about a horizontal axis extending perpendicular to the plate 11 during rotation of the plate 11 with respect to the cam 40. The lever has secured to its end 45 a member 47 which is mounted within a bearing 48 for universal movement with respect to the bearing. The bearing 48 is attached to a similar bearing 50 which mounts for universal movement a member 51 secured to the plate 20.

The rollers are biased into engagement with the peripheral surface 42 of the cam 40 by means of a pair of helical springs 52 and 53. The spring 52 has ends which are attached respectively to screws projecting from the ends 45' and 45"' of the levers 44' and 44"' which are associated with the workholders A' and A"'. In a similar manner the spring 53 has its ends attached respectively to screws extending from the ends 45 and 45" of the levers 44 and 44" which are associated with the workholders A and A". With the described arrangement the workholders will be tilted about the axes of the pins 38, 38', 38" and 38"' as the plate 11 is rotated and the workholders are correspondingly rotated.

It is noted that the radius of the cam 40 decreases in a clockwise direction as viewed in FIG. 3 as the workholder is rotated from the loading station to the working station and that the radius increases as the workholder is rotated from the working station to the unloading station. The radius of the cam 40 is substantially constant between the unloading station and the loading station so that no tilting action of the workholder is effected during rotation of the workholder subsequent to unloading thereof. As the workholder is rotated from the loading station toward the working station it will be tilted toward the observer as viewed in FIG. 3 through an angle of the order of ninety degrees, and as the workholder is rotated from the working station toward the unloading station it will be tilted away from the observer through an angle of the order of ninety degrees.

The workholders also include means for supporting the plates and separators when the workholders are in the working station. Each of the support assemblies is of similar construction and therefore only the assembly associated with the workholder A will be described. The corresponding parts of the other support assemblies will be designated by the same reference characters with prime, double prime and triple prime marks affixed thereto respectively.

The support assembly includes a pair of spaced L-shaped brackets 55 secured to a plate 56 which in turn is attached to a rod 57 extending perpendicular to the plate 56 and parallel to the plate 20. The rod 57 is slidably mounted within a bore of the bracket 39 and within a bore formed in a bracket 58 which is attached to the plate 20. A helical spring 59 is compressed between the bracket 39 and a collar 60 fixed to the rod 57.

The plate 56 together with the L-shaped brackets 55 is displaceable towards the rods and legs of the workholder into a plate and separator supporting position as the workholder is rotated from the loading station toward the working station and is displaced away from the remainder of the workholder as the workholder is rotated toward the unloading station from the working station. Displacement of the plate 56 and brackets 55 is effected by a pair of cams 61 and 62 (FIG. 5) which are spaced angularly about the axis of the shaft 12. These cams are illustrated as being secured to the plate 14 rearwardly of the plate 11 at approximately diametrically opposite positions adjacent the loading and unloading stations respectively.

The cams 61 and 62 include sloping cam surfaces which cooperate with a rounded terminal 63 of the rod 57 so that when the workholder is in either the loading or unloading stations the terminal 63 engages the peak of the cam surface of the associated cam to displace the plate 56 and the brackets 55 to their extreme positions away from the remainder of the workholder. As the workholder is rotated from the loading station the terminal 63 of the rod 57 will engage the rearwardly sloping surface portion of the cam 61 with the result that the plate 56 and the brackets 55 will be displaced toward the remainder of the workholder. When the workholder is rotated away from the working station the terminal 63 engages the forwardly sloping surface portion of the cam 62 which results in displacement of the plate 56 and brackets 55 away from the remainder of the workholder. When the workholder is in either the loading or unloading stations and the brackets 55 are displaced away from the remainder of the workholder, the lugs 17 are spaced horizontally of the brackets 55 so as to permit insertion and withdrawal of the stack.

As previously mentioned, when the workholder is in the working station it is tilted through an angle of the order of ninety degrees about an axis parallel to the plate 11 from its angular position when it is at the loading station. When the workholder is so positioned the lower edges of the plates and separators rest upon the upper edges of the brackets 55 and the lugs 17 extend downwardly below the upper edges of the brackets 55. The workholder is vibrated when at the working station in order to properly align the plates and separators carried thereby.

Figure 2:
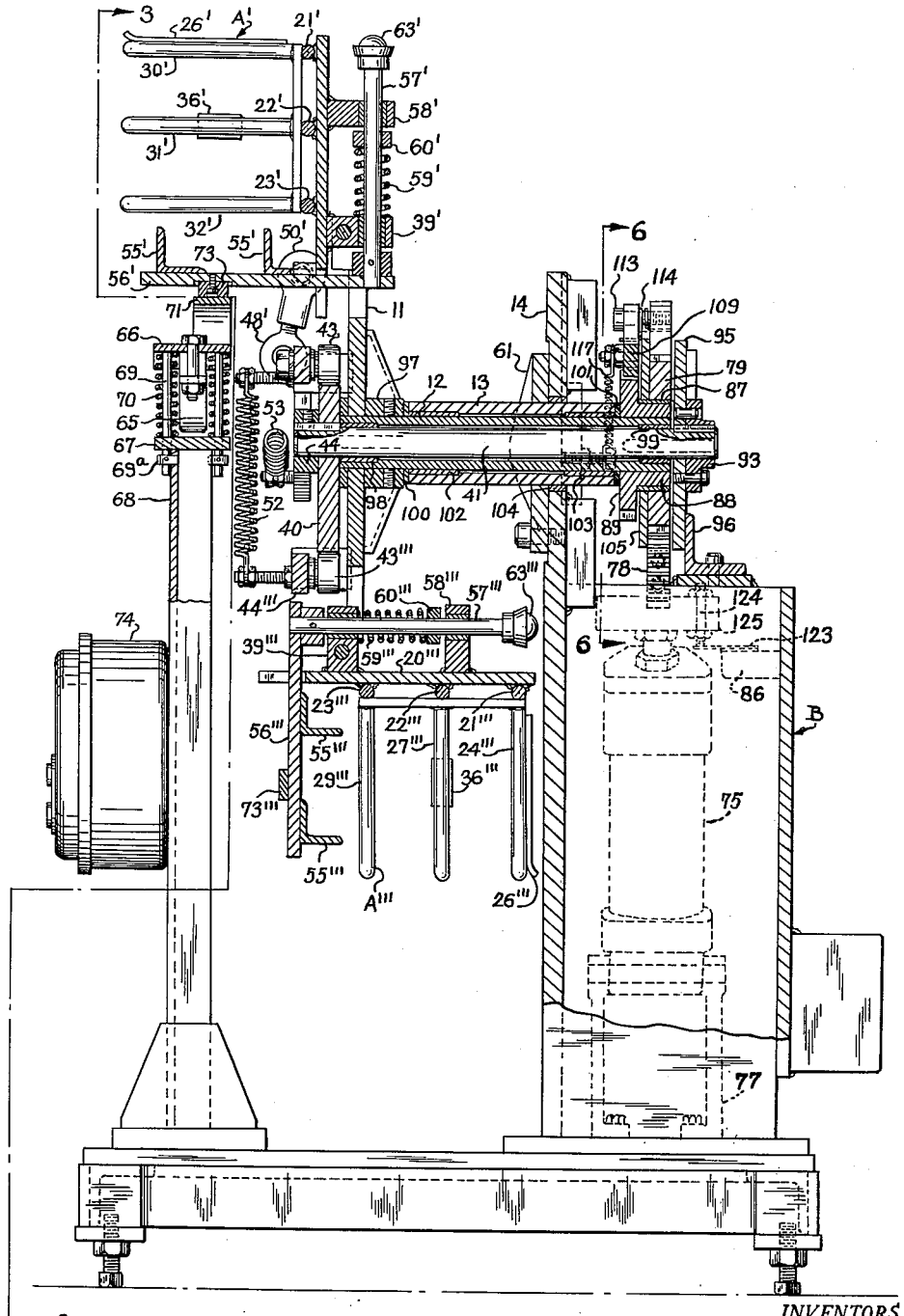

As best shown in FIG. 2, the vibrator mechanism includes a conventional vibrator air motor 65 which is supported by a plate 66 to be positioned between the plate 66 and a base member 67 which resiliently supports the plate 66. The base 67 is carried by a vertically extending support 68 and includes four openings through which extend a like number of posts 69 projecting from the plate 66. A plurality of helical springs 70 surround the posts 69 in engagement with the lower surface of the plate 66 and the upper surface of the base 67. Collars 69a are fixed to the posts 69 beneath the base 67 to limit the amplitude of vibration. An arcuate shoe 71 is secured to side flanges of the plate 66 to engage a pad 73 which is carried by the plate 56 therebeneath. The pad 73 is carried into engagement with the shoe 71 when the associated workholder has been pivoted during its movement toward the working station.

The motor 65 may be supplied with air under pressure from a suitable pressure air source and operates to vertically vibrate the plate 66 and the shoe 71 with respect to the base 67. This action results in vibration of the pad 73 and the plate 56 relative to the remainder of the workholder so that the plates and separators which are supported by the brackets 55 are vertically vibrated to effect the proper alignment of the lugs 17. The support 68 may carry a conventional manually actuatable start switch 74 which is employed to initiate operation of the machine.

The driving means for effecting indexing rotation of the workholders may consist of a fluid actuated motor of the piston-cylinder type including a cylinder 75 and a piston within the cylinder having a piston rod 76 extending outwardly of the cylinder. The cylinder 75 is pivotally secured at its lower end to a frame 77 and the piston rod has attached thereto a rack 78 which engages a gear 79 rotatable about a horizontal axis and operatively connected to the plate 11 so that rotation of the gear 79 resulting from extension of the piston rod outwardly of the cylinder imparts rotation to the plate 11.

A suitable fluid such as air is supplied from a pressure fluid source (not shown) to the cylinder at each end thereof through conduits 80 and 81 which lead to a conventional two-way solenoid valve 82 for controlling the supply of fluid to the cylinder. The valve 82 may be carried by the frame B and includes conventionally a displaceable plunger (not shown) which is displaced by means of an electrically energizable relay 84 which is energized under the control of a pair of limit switches 85 and 86. These limit switches are operated in response to movement of the rack 78, as will appear hereinafter.

Figure 4:
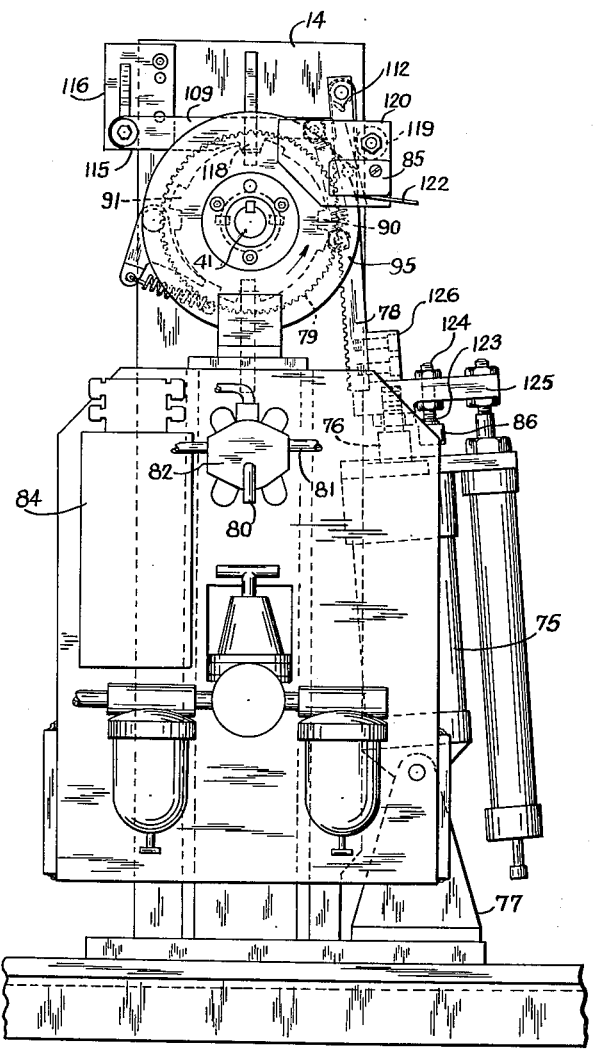

The gear 79 surrounds a bearing 87 shown in FIG. 2 which is carried by and surrounds an annular extension 88 of a sprocket 89 having notches 90 (FIGS. 4 and 6) spaced angularly about the periphery thereof and adjacent projections 91 extending from the periphery of the sprocket. The sprocket 89 and the gear 79 are rotatable relative to each other about a horizontal axis and the sprocket is keyed to the drive shaft 12 which surrounds the horizontally extending shaft 41 which is keyed to a pair of spaced bosses 93 and 94 at its ends. The boss 93 at the rear end of the shaft 41 is secured to a vertically extending plate 95 which has a central opening through which the shaft 41 extends and which is secured to an L-shaped bracket 96 attached to the frame B. The boss 94 is fixed to the cam 40 which serves to effect tilting of the workholders as previously described. The cam 40 is spaced forwardly of the plate 11 which is secured to a tubular sleeve 97 fixed to and surrounding the drive shaft 12. Longitudinally spaced bearings 98 and 99 are located between the shaft 12 and the shaft 41. The bearing sleeve 13 surrounds the shaft 12 and extends between the sleeve 97 and the sprocket 89 and is spaced therefrom by thrust bearings 100 and 101. Spaced bearings 102 and 103 are located between the shaft 12 and the sleeve 13. The sleeve 13 extends through and is secured to an annular ring 104 which is attached to the vertically extending plate 13.

In order to effect rotation of the sprocket 89 and the plate 11 in response to rotation of the gear 79 a pawl assembly carried by a plate 105 secured to the gear 79 cooperates with the projections 91 of the sprocket. The plate 105 is located between the gear 79 and the sprocket 89 and pivotally mounts a pawl 106 which is biased toward the sprocket by a spring 107 having ends secured respectively to an extension of the pawl and the plate 105. The pawl provides a driving connection between the gear 79 and the sprocket 89 so that the sprocket and the plate 11 will be rotated as a unit when the gear 79 and the plate 105 are rotated by extension of the piston rod outwardly of the cylinder.

Figure 6:
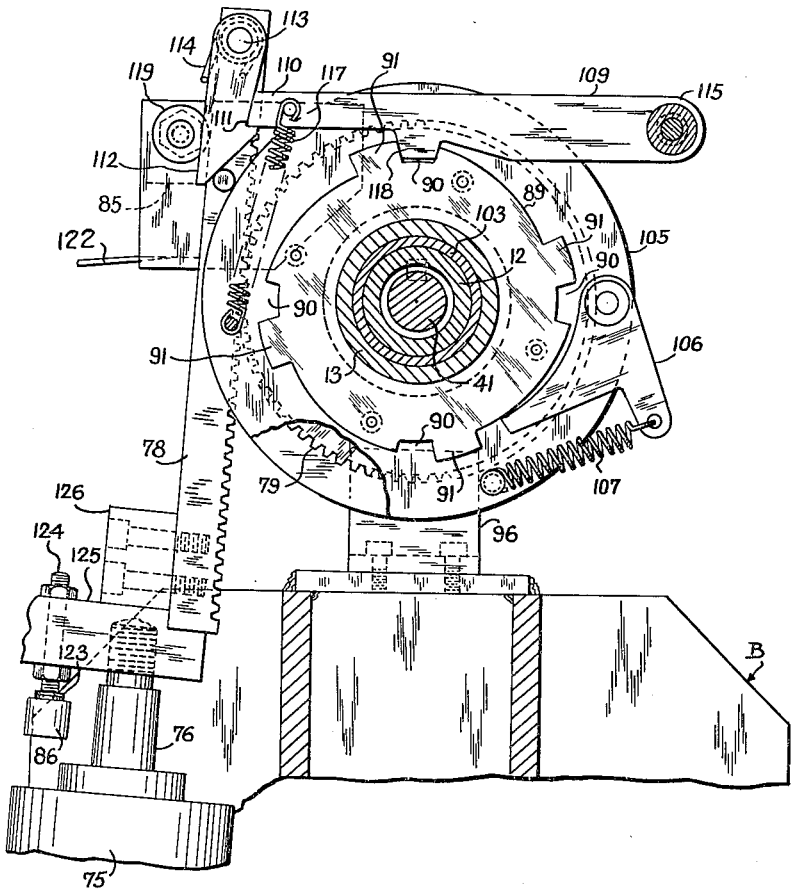

When the piston rod and the rack are moved upwardly as viewed in FIG. 6, the gear 79 and the plate 105 are rotated in a clockwise direction to carry the pawl 106 into engagement with one of the projections 91 which results in rotation of the sprocket and the plate 11 in a clockwise direction. When the piston rod and the rack are retracted downwardly the gear 79 and the plate 105 are rotated in the counterclockwise direction to carry the pawl therewith relative to the sprocket out of driving engagement with a projection 91.

A latching mechanism is utilized to retain the sprocket and the plate 11 in an indexed position during retraction of the rack. For this purpose a latch bar 109 is mounted above the sprocket 89 for pivotal movement about a horizontal axis and includes an end 110 adapted for positioning within a notch 111 formed in a latch pawl 112 which is pivoted to the rack by a pivot screw 113 and which is biased toward the latch bar 109 by a coil spring 114 attached to the pawl 112 and the screw 113. The bar 109 is pivotally mounted at its other end 115 to a bracket 116 secured to the rear face of the plate 14. A spring 117 serves to bias the bar 109 toward the peripheral surface of the sprocket 89. The bar 109 is formed with a projection 118 configured to fit within the notches 90 formed in the sprocket 89 to effect the latching action. A roller 119 is rotatably carried by a bracket 120 secured to the plate 105 to prevent disengagement of the rack with the gear 79.

The limit switches 85 and 86 are supported respectively by the bracket 120 and by the frame B and include respectively actuating elements 122 and 123 which are positioned to be engaged by opposite ends of a screw 124 carried by a support 125 secured to the piston rod and having an upright portion 126 to which the rack is mounted. When the rack is elevated from its retracted position illustrated in FIG. 6 to effect clockwise rotation of the gear 79 and corresponding rotation of the plate 11, the upper end of the screw 124 will engage the element 122 for operating the limit switch 85. This effects energization of the relay 84 to operate the solenoid valve 82 so that the supply of pressure fluid to the cylinder is reversed, whereby fluid under pressure will be supplied to the upper end of the cylinder and the lower end of the cylinder will be connected to drain. As a result, the piston rod and the rack will be retracted in a generally downward direction to effect counterclockwise rotation of the gear 79. During this time the plate 11 and the workholders carried thereby are not indexed inasmuch as the pawl 106 will rotate with the plate 105 out of driving engagement with a projection 91 of the sprocket.

As the piston rod and rack are retracted the screw 124 will engage the actuating element 123 of the limit switch 86 to energize the relay 84 which operates the solenoid valve 82 to again reverse the fluid connections to the cylinder so that the lower end of the cylinder is connected to pressure fluid and the upper end thereof is connected to drain. This results in movement of the piston rod and rack outwardly of the cylinder so that the rack is elevated to effect clockwise rotation of the gear 79.

In operation, a stack S of alternately arranged plates and separators is automatically loaded from the conveyor C into the workholder A which straddles the conveyor C when at the loading station. The stack is inserted through the action of the conveyor C with the lugs 17 extending horizontally toward the observer as viewed in FIG. 1. At this time the terminal 63 of the rod 57 is in engagement with the cam 61 so that the plate 56 and the brackets 55 will be spaced sufficiently from the plate 16 to allow insertion of the stack into the workholder. The automatic operation of the apparatus may then be initiated by actuation of the start switch 74 which effects energization of the relay 84 to operate the solenoid valve 82 for causing extension of the piston rod outwardly of the cylinder to elevate the rack. As the rack is elevated the pawl 112 pivots the bar 109 in a clockwise direction so that the projection 118 of the bar 109 is lifted out of the associated notch 90 of the sprocket and the gear 79 is simultaneously rotated in a clockwise direction. Such rotation of the gear causes rotation of the plate 105 and the pawl 106 in a clockwise direction so that the pawl 106 engages the adjacent projection 91 of the sprocket to effect clockwise rotation of the sprocket. During this action the loaded workholder A is being rotated or indexed toward the working station and is simultaneously being tilted toward the observer as viewed in FIG. 1 by action of the cam 40 and the cam follower F. Also at this time the rod 57 is being displaced under action of the cam 61 such that the brackets 55 are moving toward the plate 16 into engagement with the lower edges of the plates and separators. During elevation of the rack the bar 109 is released from the notch 111 and the projection 118 is biased into engagement with the peripheral surface of the sprocket.

When the rack has been elevated to the extent necessary to effect rotation of the gear 79 through an angle of the order of ninety degrees the actuating element 122 of the limit switch 85 is engaged by the screw 124 to effect reversal of the fluid connections to the cylinder so that the piston rod and rack will be retracted downwardly. During this time the loaded workholder A is at the working area and has been tilted forward as viewed in FIG. 1, so that the pad 73 engages the shoe 71, whereby the brackets 55 are being vibrated relative to the rods 21, 22, 23, 30, 31 and 32 to cause alignment of the edges of the plates and separators engaged by the brackets. The workholder A is retained at the working area during the retraction of the piston rod and rack by means of the projection 118 of the bar 109 which is now positioned within one of the notches 90 of the sprocket. At this time the workholder A''' is at the loading station and may be loaded with a stack of plates and separators.

When the ratchet has been retracted to the extent whereby the actuating element 123 is engaged by the screw 124 the relay 84 is energized to actuate the solenoid valve 82 for reversing the fluid connections to the cylinder such that the piston rod and rack are again elevated to effect clockwise rotation of the gear. The described operations continue in this manner and the workholders are thereby repeatedly indexed about a horizontal axis between the four stations. When the loaded workholder A arrives at the unloading station the stack therein is withdrawn by the conveyor C'.

Although the invention has been described with reference to certain specific embodiments thereof numerous modifications are possible and it is desired to cover all modifications falling within the spirit and scope of the appended claims.

Having described our invention, we claim:

1. In an apparatus of the character described, a workholder adapted to receive a stack of plate-like articles, means supporting said workholder for movement in a predetermined path, means for operating said last-named means to move said workholder sequentially through loading, working and unloading stations, said workholder including a portion for supporting the plate-like articles when the workholder is at said working station, means mounting said portion for displacement towards and away from the remainder of said workholder, means operable to move said portion towards the remainder of the workholder during movement of the workholder from the loading station to the working station, and means for vibrating said portion while the workholder is at the working station.

2. In an apparatus of the character described, a workholder adapted to receive a stack of plate-like articles, means supporting said workholder for movement in two directions transversely of one another at least one of which is rotary, means for moving said workholder in said directions, means for intermittently actuating said last-named means in timed relation to one another to move said workholder sequentially through loading, working and unloading stations and for oscillating said workholder through an angle of the order of ninety degrees as it is moved through said sequence of stations, and means for vibrating said workholder while at said working station.

3. In an apparatus of the character described, a member, means supporting said member for movement in a predetermined path, a workholder adapted to receive a stack of plate-like articles, means pivotally connecting said workholder to said member for pivotable movement about an axis generally parallel with said path, means for intermittently moving said member in said path to move said workholder sequentially through loading, working and unloading stations, means for pivoting said workholder in a first direction through an angle of the order of ninety degrees during its movement between said loading and working stations and for pivoting said workholder through an angle of ninety degrees in a second direction opposite to said first direction during its movement from said working station to said unloading station, and means for vibrating said workholder while in said working sation.

4. In an apparatus of the character described, a member, means supporting said member for movement in a predetermined path, a workholder adapted to receive a stack of plate-like articles, means pivotally connecting said workholder to said member for pivotable movement about an axis generally parallel with said path, means for intermittently moving said member in said path to move said workholder sequentially through loading, working and unloading stations, said workholder including a portion for supporting the plate-like articles when the workholder is at said working station, means mounting said portion for displacement towards and away from the remainder of said workholder, means for pivoting said workholder in a first direction through an angle of the order of ninety degrees during movement of the workholder from the loading station to the working station and for pivoting said workholder in a second direction opposite to the first direction through an angle of the order of ninety degrees during movement of the workholder from the working station to the unloading station, means for displacing said portion towards the remainder of the workholder during movement of the workholder from the loading station to the working station and for displacing said portion away from the remainder of the workholder during movement of the workholder from the working station to the unloading station, and means for vibrating said portion while the workholder is at the working station.

5. In an apparatus of the character described, a member, means supporting said member for movement in a circular path about a horizontal axis, a workholder adapted to support a stack of plate-like articles, means pivotally connecting said workholder to said member for pivotable movement about an axis generally perpendicular to said horizontal axis, means for intermittently moving said member in said path to move said workholder sequentially in an upper semi-circular arc through loading, working and unloading stations, means for pivoting the workholder in a first direction through an angle of the order of ninety degrees during movement of the workholder from the loading station to the working station and for pivoting the workholder in a second direction opposite to the first direction through an angle of the order of ninety degrees during movement of the workholder from the working station to the unloading station, and means for vertically vibrating the workholder while at the working station.

6. In an apparatus of the character described, a member, means supporting said member for movement in a circular path about a horizontal axis, a workholder adapted to support a stack of plate-like articles, means pivotally connecting said workholder to said member for pivotable movement about an axis generally perpendicular to said horizontal axis, means for intermittently moving said member in said path to move said workholder sequentially in an upper semi-circular arc through loading, working and unloading stations, said workholder including a portion for supporting the plate-like articles when the workholder is at said working station, means mounting said portion for displacement towards and away from the remainder of said workholder, first cam and cam follower means for pivoting the workholder in a first direction through an angle of the order of ninety degrees during movement of the workholder from the loading station to the working station and for pivoting the workholder in a second direction opposite to the first direction through an angle of the order of ninety degrees during movement of the workholder from the working station to the unloading station, second cam and cam follower means for displacing said portion towards the remainder of the workholder during movement of the workholder from the loading station to the working station and for displacing said portion away from the remainder of the workholder during movement of the workholder from the working station to the unloading station, and means for vertically vibrating said portion while the workholder is at the working station.

7. In an apparatus of the character described, a member, means supporting said member for rotation about a first axis, a plurality of workholders each adapted to receive a stack of plate-like articles, means pivotally connecting the workholders to said member spaced angularly about the first axis for pivotal movement about second axes generally perpendicular to the first axis, means for rotating said member about the first axis to carry the workholders sequentially through loading, working and unloading stations, means for pivoting each workholder in a first direction through an angle of the order of ninety degrees during its movement from the loading to the working station and for pivoting each workholder in a second direction through an angle of the order of ninety degrees during its movement from the working station to the unloading station, and means for vibrating each workholder while at said working station.

8. In an apparatus of the character described, a member, means supporting said member for rotation about a first axis, a plurality of workholders each adapted to receive a stack of plate-like articles, means pivotally connecting the workholders to said member spaced angularly about the first axis for pivotal movement about second axes generally perpendicular to the first axis, means including fluid pressure actuated piston means for intermittently rotating said member about the first axis to carry the workholders sequentially through loading, working and unloading stations, cam and cam follower means for pivoting each workholder in a first direction through an angle of the order of ninety degrees during its movement from the loading to the working station and for pivoting each workholder in a second direction through an angle of the order of ninety degrees during its movement from the working station to the unloading station, and means for vibrating each workholder while at said working station.

9. In an apparatus of the character described, a member, means supporting said member for rotation about a first axis, a plurality of workholders each adapted to receive a stack of plate-like articles, means pivotally connecting the workholders to said member spaced angularly about the first axis for pivotal movement about second axes generally perpendicular to the first axis, means for intermittently rotating said member about the first axis to carry the workholders sequentially through loading, working and unloading stations, each of said workholders including a portion for supporting the plate-like articles when the workholders are at said working station, means mounting said portions for displacement towards and away from the remainder of the associated workholder, first cam and cam follower means for pivoting each workholder in a first direction through an angle of the order of ninety degrees during movement of the workholders from the loading station to the working station and for pivoting each workholder in a second direction opposite to the first direction through an angle of the order of ninety degrees during movement of the workholders from the working station to the unloading station, second cam and cam follower means for displacing said portions towards the remainder of the associated workholder during movement of the workholders from the loading station to the working station and for displacing said portions away from the remainder of the associated workholder during movement of the workholders from the working station to the unloading station, and means for vibrating said portions while the workholders are at the working station.

10. In an apparatus of the character described, a member, means supporting said member for rotation about a horizontal axis, a plurality of workholders each adapted to receive a stack of plate-like articles, means pivotally connecting the workholders to said member spaced angularly about the horizontal axis for pivotal movement about axes generally perpendicular to the horizontal axis, means for intermittently rotating said member about the horizontal axis to carry the workholders sequentially in an upper semi-circular arc through loading, working and unloading stations, each of said workholders including a portion for supporting the plate-like articles when the workholders are at said working station, means mounting said portions for displacement towards and away from the remainder of the associated workholder, first cam and cam follower means for pivoting each workholder in a first direction through an angle of the order of ninety degrees during movement of the workholders from the loading station to the working station and for pivoting each workholder in a second direction opposite to the first direction through an angle of the order of ninety degrees during movement of the workholders from the working station to the unloading station, second cam and cam follower means for displacing said portions towards the remainder of the associated workholder during movement of the workholders from the loading station to the working station and for displacing said portions away from the remainder of the associated workholder during movement of the workholders from the working station to the unloading station, and means for vertically vibrating said portions while the workholders are at the working station.

References Cited in the file of this patent

UNITED STATES PATENTS

| 1,090,473 | Gullberg | Mar. 17, 1914 |
| 1,335,221 | Christensen | Mar. 30, 1920 |
| 2,050,119 | Piche | Aug. 4, 1936 |
| 2,112,621 | Henszey | Mar. 29, 1938 |